United States Patent [19]

Boehling et al.

[11] 4,181,451

[45] Jan. 1, 1980

[54] DEVICE FOR DISPOSAL OF ANIMAL EXCREMENT

[76] Inventors: Daniel E. Boehling, 2341 Castlebridge Rd., Midlothian, Va. 23113; Carl L. Cash, 2730 Tinsley Dr., Richmond, Va. 23235

[21] Appl. No.: 932,726

[22] Filed: Aug. 10, 1978

[51] Int. Cl.² ............................................. C02C 1/02
[52] U.S. Cl. ........................................ 405/128; 4/116; 119/1; 210/170
[58] Field of Search ........................... 405/128; 119/1; 210/170, 237; 4/115, 116

[56] References Cited

U.S. PATENT DOCUMENTS

| 3,276,427 | 10/1966 | Edwards | 119/1 |
| 3,575,140 | 4/1971 | Prepeliczay | 119/1 |

*Primary Examiner*—Mervin Stein
*Assistant Examiner*—Alexander Grosz
*Attorney, Agent, or Firm*—Norman B. Rainer

[57] ABSTRACT

A device intended for underground installation and microbiological decomposition of animal excrement has a tubular shaft having hinged closure means at its upper extremity and gripping means at its lower extremity which engage a large bucket. Mounted on the outer periphery of the shaft are an outwardly extending flange, spacer means to separate said flange vertically from the upper rim of said large bucket, and retainer means which function to position the shaft coaxially with said large bucket. A small bucket rests mouth upward on the inside bottom of said large bucket. The buckets confine a microbiologically active liquid. Excess quantities of said liquid are permitted to flow over the upper rim of said large bucket and enter an annular space surrounding said bucket from when the liquid dissipates into the earth. A tether means facilitates the lifting of the small bucket through said shaft. Sensor means are provided to conveniently determine the level of inert sediment accumulated within said small bucket.

7 Claims, 3 Drawing Figures

DEVICE FOR DISPOSAL OF ANIMAL EXCREMENT

BACKGROUND OF THE INVENTION

This invention relates to an improved device for the disposal of animal excrement, and is particularly concerned with a septic disposal device designed for outdoor underground installation and which includes a reservoir adapted to confine a microbiologically active liquid and discharge excess of said liquid into the surrounding earth.

In the management of animal enclosures such as kennels for dogs, the removal and disposal of excrement is necessary to maintain sanitary conditions. The use of a receptacle which serves as a holding vessel during the accumulation of animal excrement is disclosed in U.S. Pat. No. 3,575,140 to Prepeliczay. When the Prepeliczay device becomes filled to its capacity, the excrement must be removed therefrom for disposal elsewhere. An underground septic device for the disposal of animal excrement is disclosed in U.S. Pat. No. 3,276,427 to Edwards. Although the Edwards device achieves disposal of the excrement, its design does not readily permit servicing and maintenance of the underground septic disposal system.

The devices of both the Prepeliczay and Edwards patents are predicated upon training the animal to defecate directly into the device. Although such training may be achieved with isolated pet animals carefully trained by their owners, such cannot be achieved in animal enclosures containing many animals. Typical animal enclosures such as kennels generally include an outdoors area provided with a sand or gravel ground cover. The excrement is gathered manually. In the course of picking up the excrement from the ground with a shovel or comparable tool, a certain amount of ground cover material will be taken up.

It has been found that non-biodegradable sand, gravel or other ground cover material introduced into the system will accumulate and cause malfunction. Under such circumstances, it is therefore necessary to frequently remove accumulated sediment from the system. This should preferably be accomplished in a convenient manner and should permit the biologically active fluid media to remain in its confining reservoir. Otherwise, a new active media would have to be generated by introduction of a culture of micro-organisms. In addition to the expense of the culture, restoration of full activity may take several days.

Certain septic systems, such as that shown in the Edwards patent, utilize special overflow means to maintain a constant amount of active fluid in an underground reservoir. Although this objective is desirable, the need for specially constructed features may increase the cost of fabrication and difficulty of installation.

It is accordingly an object of the present invention to provide a device for the disposal of animal excrement by means of a biologically active fluid media confined in a reservoir disposed underground. It is a still further object of this invention to provide an inexpensive device for the disposal of animal excrement, said device being simple to install in an underground disposition and containing a reservoir that permits continuous and uniform overflow of fluid into an underground region surrounding said device. These objects and advantages of the invention will be apparent from the following description.

SUMMARY OF THE INVENTION

The above and other beneficial objects and advantages are accomplished in accordance with the present invention by an improved disposal device which comprises in combination a large bucket, a tubular shaft member hingedly covered at its upper extremity and having at its lower extremity gripping means for engaging the inside of said large bucket, an outwardly directed flange disposed about said shaft, retainer means disposed on the outside of said shaft below said flange adapted to engage the circular upper rim of said large bucket to cause coaxial alignment of said shaft with said large bucket, spacer means to separate said flange from the upper rim of said large bucket, a small bucket adapted to fit within said shaft and rest mouth-upward on the bottom of said large bucket, tether means connecting said small bucket with an upper portion of said shaft, and sediment detector means associated with said small bucket and operable from an upper portion of said shaft.

In preferred embodiments, the shaft member is fabricated as tubular sections of circular cross-sectional configuration which may be readily assembled to form an effectively continuous integral shaft. It is preferable that, in either unitary or segmented shaft embodiments, at least the upper region of the shaft is outwardly tapered so that it possesses a larger cross-sectional diameter at its upper extremity than at lower portions thereof. The large bucket preferably is fabricated from a plastic material and is outwardly taped in similar manner to the aforesaid taper of preferred embodiments of the shaft.

The flange, and the spacer and retainer means are preferably contiguous members. The spacer and retainer means may be of unitary construction and several of such units may be uniformly spaced about the outer periphery of the shaft and centered on a plane perpendicular to the longitudinal axis of the shaft. The sediment detector means may consist of a weight arranged to rest within the small bucket and attached by a tether to the shaft at a site adjacent the upper extremity thereof. The gripping means at the lower extremity of the shaft may be fabricated by causing straight cuts of short length to be formed in the tubular shaft codirectional with the shaft axis and uniformly disposed about the periphery of the shaft, and bending outwardly the tabs formed between adjacent cuts.

BRIEF DESCRIPTION OF THE DRAWINGS

In the accompanying drawing forming a part of this specification and in which similar numerals of reference indicate corresponding parts in all the figures of the drawing.

DETAILED DESCRIPTION OF THE INVENTION

Figure 1:
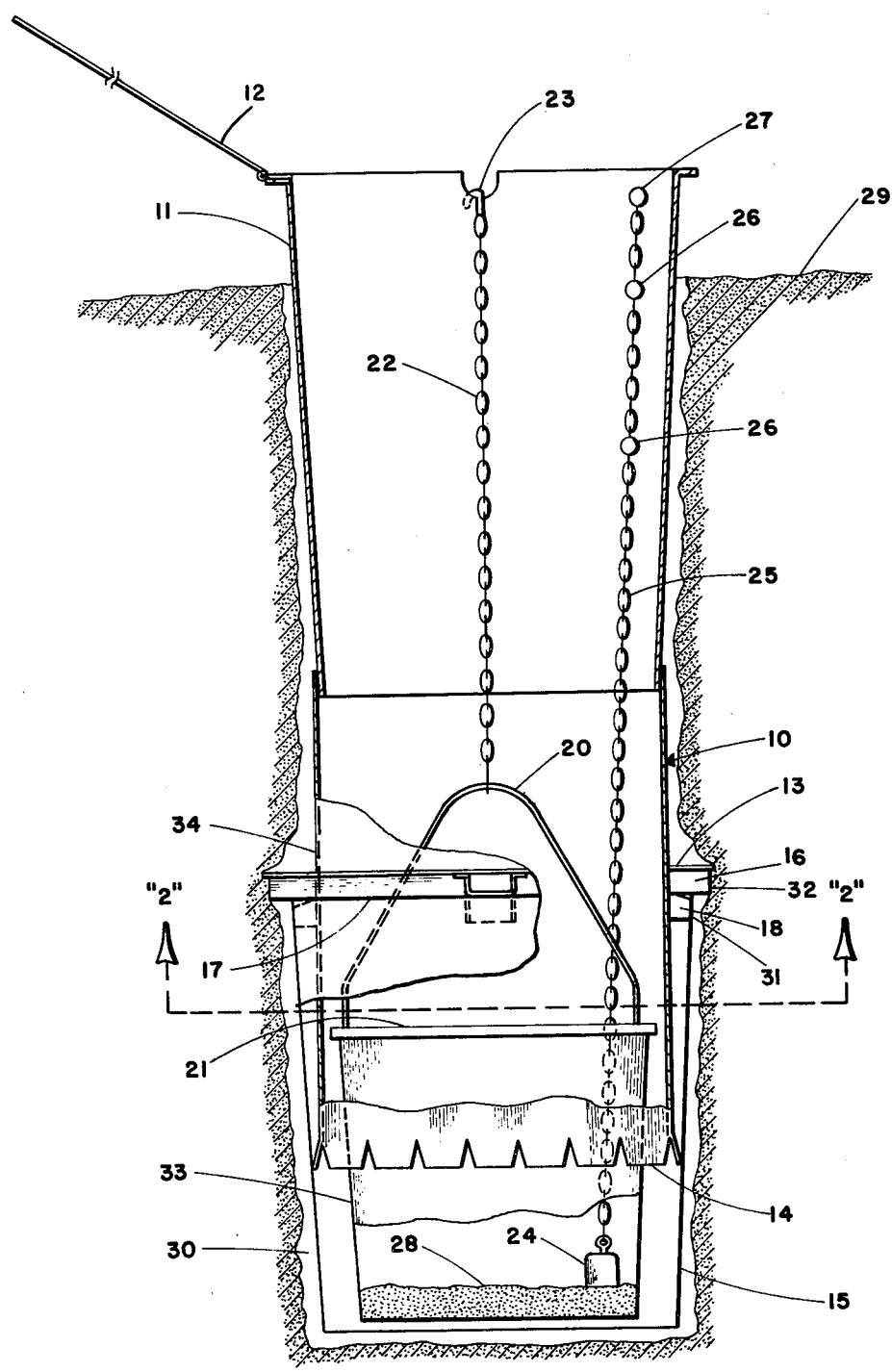
FIG. 1 is an elevational view of a device embodying the principles of this invention, partially broken away to better illustrate the inner construction.
Figure 2:
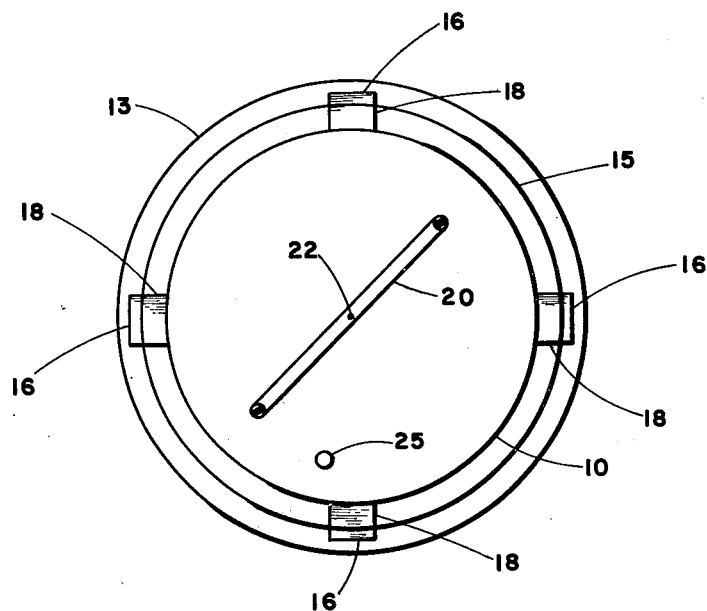
FIG. 2 is a transverse sectional view taken on line 2—2 of FIG. 1.

Referring to FIG. 1, a disposal device of the present invention is illustrated comprising tubular shaft 10 having an outwardly tapered conically contoured upper section 11, the lowermost end of which seats within and frictionally engages lower section 34 having a circular cylindrical configuration. A hinged lid 12 is mounted atop the upper extremity of upper section 11. Lower section 34 is provided with an external circumferential flange 13 and circumferentially disposed gripping tabs 14 at its lower extremity. A large bucket 15 having an outwardly tapered sidewall receives the lower extremity of lower section 34, engaging said extremity at a locus approximately mid-height of said bucket. The gripping tabs 14 engage the inside wall of bucket 15 with an interactive force sufficient to enable the bucket to be lifted by shaft 10 if and when desired. It should be noted that shaft 10 and bucket 15, when properly engaged are in coaxial alignment.

Four separate, identically constructed spacers 16 are symmetrically disposed about the outer periphery of lower section 34 attached to the underside of flange 13. The bottom surfaces of said spacers rest on rim 17 of bucket 15, thereby functioning to prevent flange 13 from resting directly upon rim 17. The openings bounded by flange 13, rim 17, and adjacent spacers 16, constitute passageways for fluid to overflow from bucket 15.

Figure 3:
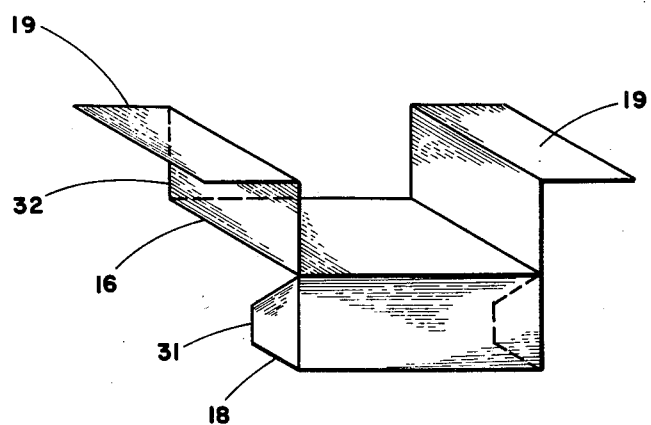
FIG. 3 is an enlarged perspective view of a unitary spacer-retainer unit employed in the embodiment of FIG. 1.

As shown more clearly in FIG. 3, each spacer 16 is associated with a retainer 18 disposed below spacer 16 as an integral continuation thereof. The outermost extremity 31 of retainer 18 is positioned closer to the shaft axis than the outermost extremity 32 of spacer 16. In this manner, retainers 18 fit within bucket 15, engaging the inner wall thereof to ensure coaxial alignment of said bucket with shaft 10. In the preferred embodiment illustrated in FIG. 3, retainer 18 and spacer 16 are shown as being fabricated by suitable cutting and bending of a flat piece of sheet metal. In said embodiment, upper wings 19 are utilized for attachment of the unitary structure to the underside of flange 13 by welding, riveting or other means.

Small bucket 33, equipped with lifting handle 20 is concentrically positioned mouth upward within large bucket 15. The upper rim 21 of small bucket 33 has a diameter slightly smaller than the smallest inside diameter of shaft 10, thereby permitting unimpeded upward passage through shaft 10. A tether chain 22 extends from handle 20 to an anchor site 23 located on the inside wall of the shaft adjacent the upper extremity thereof.

A weight 24 attached to tether chain 25 suspended from a site 27 within said shaft serves as a means for detecting the level of sediment 28 in bucket 33. Detection of said level is accomplished by manually lifting weight 24 by means of chain 25, and allowing the weight to re-settle atop the sediment. By pulling chain 25 to a straightened, slack-free path, its length can be gauged by comparing the position of indicator beads 26 incorporated within the chain relative to the site of attachment 27.

The tubular shaft 10 may be fabricated from aluminum, galvanized iron, copper, or plastic material in sheet form by suitable shaping and joining methods. Seamless extruded tubes may also be utilized. The inside diameter of the shaft may range from about 8" to 20", and its overall length may range from about 20" to 40". The ratio of its length to diameter is preferably between about 2/1 and 4/1. Ratios greater than 4/1 cause difficulties in installation and maintenance. For ease of packaging for purposes of shipping and distribution, it is preferred that the tubular shaft be comprised of two or more inter-engaging segments. It is particularly preferable for the tapered upper portion of the shaft to be a separate segment because it can be separately fabricated from sheet stock as a conically shaped section, whereas the lower portion of the shaft may have the form of a right circular cylindrical surface. Upper and lower sections of the shaft are preferably made to connect in a telescoping interengagement wherein one section is made to fit snugly within another section of slightly larger diameter. Still another advantage of the two section embodiment of shaft 10 is that, once the device outlives its usefullness, the upper section 11 can be removed and the hole can be filled in with earth.

Both the large and small buckets are preferably fabricated of an organic resinous material such as thermoplastic polymers including polyethylene, polypropylene, polyvinylchloride, polymers and copolymers of styrene, acrylonitrile, and butadiene, and other equivalent materials. Such substances are desirable because of their resistance to corrosion. Additionally, fabrication of the large bucket from such resinous or plastic substances enables gripping means 14 to establish adequately strong attachment to the inside wall of said bucket.

The device of this invention is installed into a close-fitting hole in the ground in a manner such that shaft 10 protrudes slightly above ground level 29. Because the lower end of the shaft firmly grips the large bucket, the assembled device can be precisely positioned in the hole. The hole may be slightly backfilled around the outside perimeter of the shaft, but care is taken to avoid filling the space 30 below the flange.

The biologic decomposition of excrement entered into the disposal device is accomplished by means of aqueous fluids containing microbial organisms such as bacteria and enzymes. Suitable compositions of microorganisms are comercially available, one such composition being Product LLMO, sold by General Environmental Science Corp., Cleveland, Ohio, another being Enzyo-Digester sold by Huron Products of Bellevue, Ohio 44811.

In use, the fluid composition of micro-organisms will be confined within large bucket 15, the fluid level generally being maintained at the upper rim 17 by virtue of the overflow provision. Small bucket 33 will be immersed within the fluid. Material entered into the device falls directly into the small bucket. Any fluid exceeding the volume of the large bucket overflows the upper rim 17, entering annular space 30 from whence it dissipates into the earth. Such excess fluid may arrise from the liquification of excrement or from rain water or underground water.

In the course of continued use, gravel and other inert dense material will accumulate in the bottom of small bucket 33, the amount of said accumulation being monitored by means of the aforementioned tethered weight 24. When appreciable sediment is found to be present in bucket 33, it is manually raised by means of tether chain 22. While passing through the upper, tapered region of shaft 10, the bucket may be tilted to permit some of the active fluid to return to the large bucket. Such expedient also facilitates the handling of bucket 33 once removed from shaft 10. After disposing of the sediment, the small bucket is filled with water and lowered back into its position in the disposal device.

When the small bucket is lifted for cleaning, a volume of the active fluid remains within the large bucket. This amount of the fluid, in addition to that which is spilled from the small bucket during its ascent, is adequate to perpetuate the septic action of the system.

While particular examples of the present invention have been shown and described, it is apparent that changes and modifications may be made therein without departing from the invention in its broadest aspects. The aim of the appended claims therefore, is to cover all such changes and modifications as fall within the true spirit and scope of the invention.

What is claimed is:

1. A device for the disposal of animal excrement comprising:
   (a) a large bucket having a circular upper rim,
   (b) a tubular shaft member provided with closure means at its upper extremity and having at its lower extremity gripping means which engage the inside surface of said large bucket,
   (c) an outwardly directed flange disposed about the outer surface of said shaft,
   (d) spacer means positioned below said flange and uniformly disposed about said shaft and adapted to maintain said flange separated from said upper rim,
   (e) retainer means positioned on the outer surface of said shaft below said flange and adapted to engage the large bucket adjacent its upper rim in a manner to cause coaxial alignment of said shaft with said large bucket,
   (f) a small bucket adapted to fit within said shaft and rest mouth-upward on the bottom of said large bucket,
   (g) tether means connecting said small bucket with an upper portion of said shaft, and
   (h) sediment measuring means associated with said small bucket and operable from an upper portion of said shaft.

2. The device of claim 1 wherein said shaft is comprised of at least two interengaged sections.

3. The device of claim 2 wherein an upper section of said shaft is tapered outwardly and upwardly.

4. The device of claim 1 wherein said spacer means is integral with said retainer means.

5. The device of claim 1 wherein said retainer means protrudes to a lesser extent than said spacer means from the center of said shaft.

6. The device of claim 1 wherein said shaft is fabricated of sheet metal.

7. The device of claim 1 wherein said gripping means is comprised of a series of tabs integral with said shaft and bent outwardly therefrom.

* * * * *